M. Runkel,
Rotary Steam Engine.

Nº 27,387.          Patented Mar. 6, 1860.

Witnesses:
J. W. Coombs.
Wm Lynch

Inventor:
M. Runkel

UNITED STATES PATENT OFFICE.

MARK RUNKEL, OF NEW YORK, N. Y.

OSCILLATING STEAM-ENGINE.

Specification of Letters Patent No. 27,387, dated March 6, 1860.

*To all whom it may concern:*

Be it known that I, MARK RUNKEL, of the city, county, and State of New York, have invented a new and Improved Oscillating-Piston Engine; and I do hereby declare that the following is a full, clear, and exact description of the same, reference being had to the accompanying drawing, forming a part of this specification, in which—

Figure 1:
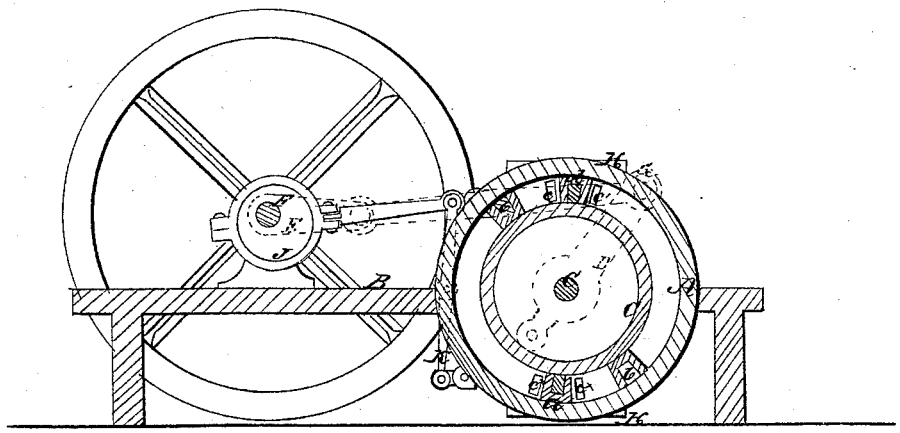
Figure 2:
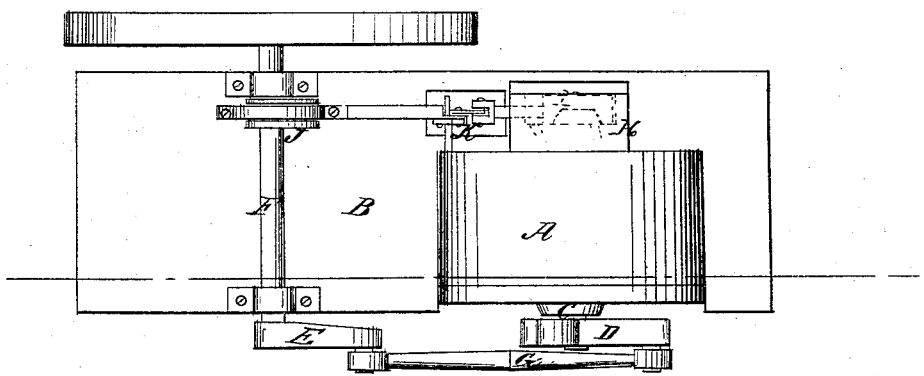

Figure 1 represents a sectional elevation of my invention, and Fig. 2 is a plan or top view of the same.

Similar letters of reference in both views indicate corresponding parts.

This invention is intended as an improvement on an oscillating piston engine for which a patent was granted to me on the 12th day of April 1859. In my former engine I used a segmental piston, working in a segmental shell, and I found that with this arrangement the pressure of the steam on the shaft which carries the piston, is so great that it becomes objectionable. At the same time it is difficult to make a tight joint on the edge of the segmental piston, it being difficult to turn such a piece perfectly true, and to make it fit nicely between the sides of the shell. To overcome these difficulties, I have now arranged a cylindrical piston with two projections in a cylindrical shell or cylinder with two abutments, and furnished with four ports, two on each side, which are governed by two slide valves operated from the same eccentric, so that the steam acts on the piston simultaneously on both sides, thus giving the double power and balancing the pressure on the shaft or piston rod, and furthermore, the joint between the edges of the piston, and the heads of the cylinder is much easier kept tight than it would be done with my former engine.

To enable those skilled in the art to make and use my invention, I will proceed to describe its construction and operation, with reference to the drawing.

The cylinder A is secured to a bed plate B, in any convenient manner. The heads of the cylinder form the bearings for the shaft or piston rod C, one end of which bears a crank D, which connects with the crank E on the fly wheel shaft F, by means of a rod G. Instead of one crank, two cranks may be employed, one on each end of the piston rod, at right angles to each other so as to avoid the dead points.

On the inside of the cylinder A, and on opposite sides of the same are two abutments $a$, $a^x$ which work steam tight on the surface of the piston C', and two projections $b$, $b^x$, extend from the piston in a radial direction, and they are furnished with suitable packing so as to work steam tight against the inner surface of the cylinder.

One of the cylinder heads is perforated with four steam ports $c$, $c'$ $c^x$ and $c^x$ two on each side, and situated on opposite sides of the abutments $a$ $a^x$ and the steam is admitted through steam chests H, which contain the slide valve I. Common D valves or any other kind of valves may be used. These valves are operated by means of an eccentric J, on the fly wheel shaft F, which connects with a rocking lever K, the two ends of which connect with the valve stems by means of rods, or in any other suitable manner.

The operation is as follows: In the position represented in Fig. 1, the engine is supposed to work in the direction of the arrow marked on the fly wheel, and it stands on its inner center. The ports $c^x$ and $c'^x$, admit steam, and the ports $c'$ and $c^x$ exhaust. The crank D moves in the direction of the arrow marked on it. The length of this crank in proportion to the length of the crank E, on the fly wheel shaft is such that when the piston has moved far enough so as to bring the projection $b$, close up to the abutment $a^x$ and the projection $b^x$ close up to the abutment $a$, the crank E, has completed one half revolution. The parts are now changed so as to admit steam through the ports $c'$ and $c^x$, and to exhaust through the ports $c$, and $c'^x$ and the piston recedes while the crank E passes its outer center. The oscillating motion of the piston is thereby converted in a rotary motion of the fly wheel shaft, and it will be easily understood that this engine will work with equal facility in both directions.

The simplicity of this engine and its compactness makes it particularly adapted for driving propellers on steam vessels, to which it can be attached in any convenient manner, and it will be noticed that the piston rod has to sustain nothing but the weight of the piston, the pressure of the steam on both sides of the piston being perfectly balanced. It will be readily understood that the position of the piston and of the cylinder can be changed, and that the inner portion C', can be made stationary, and the shell A, to oscillate, but such an arrangement I consider an equivalent to the engine herein described.

What I claim as new, and desire to secure by Letters Patent, is:

The arrangement of the oscillating cylindrical piston C', or its equivalent, in combination with the stationary cylinder A, or its equivalent, constructed and operating substantially in the manner, and for the purpose specified.

M. RUNKEL.

Witnesses:
W. HAUFF,
J. F. BUCKLEY.